Figure 1:
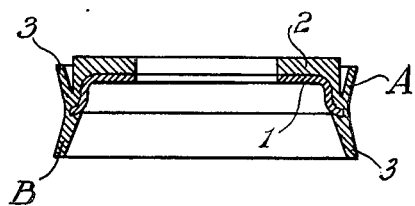

July 25, 1950 P. E. THOMAS 2,516,811
PACKING DEVICE
Filed Nov. 27, 1945

INVENTOR
Percival Edward Thomas
By Stevens and Davis
ATTORNEYS

Patented July 25, 1950

2,516,811

UNITED STATES PATENT OFFICE 2,516,811

PACKING DEVICE

Percival Edward Thomas, London, England, assignor to Sterling Industries Limited, London, England, a company of Great Britain Application November 27, 1945, Serial No. 631,156
In Great Britain November 7, 1944

4 Claims. (Cl. 309—23)

This invention relates to improvements in packing devices and has more particular reference to piston packings, wherein either a reinforced packing constitutes a piston, or wherein the said packing is housed within a relatively mobile member, e. g. a piston or plunger, and engages the wall of a relatively non-mobile member, e. g. a cylinder.

The object of the invention is to produce a seal against fluid pressures which may accrue or exist on both sides of the piston entity. Thus, on cup and U-packings a seal is produced by the pressure upon the sides of the packing by expanding the lip against the side of the working cylinder, but such packings do not resist pressures from the reverse side which said pressures tend to disengage the lips of the packing from its prior contact wall.

The present invention overcomes the above-mentioned difficulty and provides a packing wherein a wall-engaging circumferential lip is formed on both sides to constitute an upper and lower U-packing. The invention consists in an improved packing device having in combination a rigid supporting disc itself constituting or being applied to a piston entity with adhesively applied rubber or rubber like upper and lower cup shaped peripheral flanges that are inherently resilient and outwardly flared from an arcuate waistline to constitute walls and lips to engage the surface of a cylinder wall whereby in addition to the resiliency of the flanges themselves the sealing effect is proportional to the fluid pressure either side of the piston. In a preferred form a small arcuate depression is moulded between the upper and lower wall engaging lips, to assist flexing of the material and better contact with the cylinder wall under pressure.

In applying the invention to reciprocating parts of relatively small diameter such for instance as coupling devices having self-sealing valves, it is desirable that the packing device also act as a piston, and to accomplish this a metallic disc which may be corrugated or otherwise is adhesively coated with rubber or a synthetic rubber and the double-lipped packing device moulded thereupon at the circumference. In this form the rigid metal disc takes the forces creating piston movement, whilst the integral circumferential packing in combination with said disc constitutes a working piston that operates as a seal to fluid escape on both sides of the piston entity. The rubber or rubber like packing material may be extended by moulding to completely cover both sides of the disc and fulfil other functions thereby. Thus either the upper or lower areas of the rubber faced disc or piston may constitute valve seatings, this feature being of considerable merit in self-sealing pipe couplings and the like.

Figure 2:
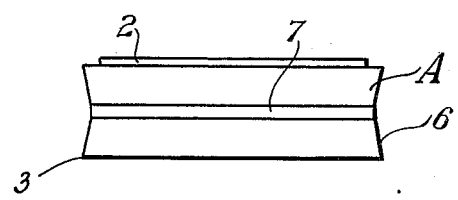
Figure 3:
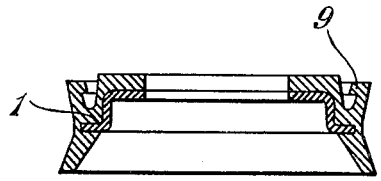
Figure 4:
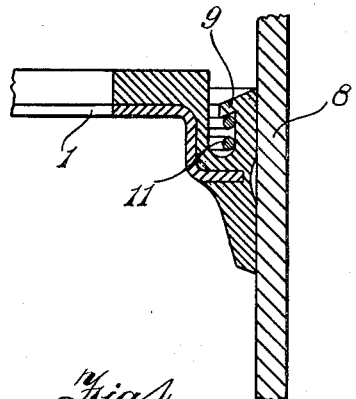
Figures 5, 6:
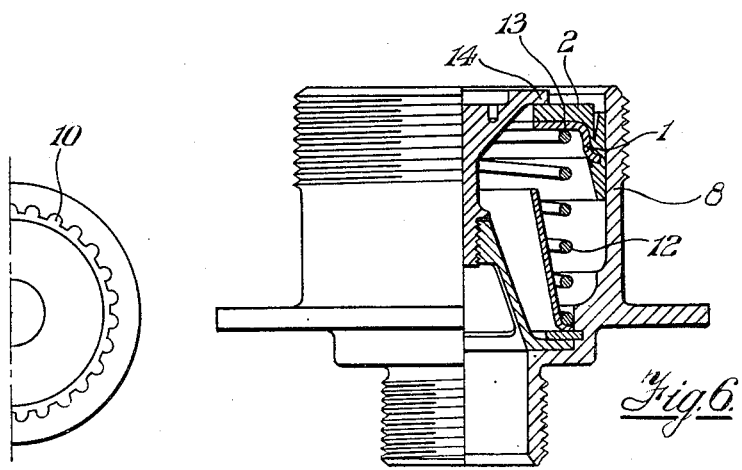

In order that the invention shall be more fully described and ascertained reference is made to the accompanying drawings wherein Fig. 1 is a cross section of the packing device according to the invention in its unmounted condition, Fig. 2 is an extended view of Fig. 1, Fig. 3 shews in cross sectional elevation a modification of the device shewn in Fig. 1, Fig. 4 shews an expanded device applied to the form of packing shewn in Fig. 3, the said packing being mounted in its operative condition within a cylinder, Fig. 5 is a plan view of Fig. 4, Fig. 6 shews the invention in part sectional elevation as applied to a part of a self-sealing hydraulic coupling.

Referring to the drawings and the figures the improved packing device comprises a reinforcing or rigid supporting disc 1 upon which is applied in a known manner with strong adhesive properties a natural or synthetic rubber, or rubber-like composition 2, which said composition may be moulded over the entire surface of the disc 1, or over parts thereof as shewn in Figs. 1 to 4. At the perimeter of the disc 1, the material 2 is moulded to form a double peripheral cup ring flange A, B, the wall and lips 3 of the part A being above the outer edge of disc 1 whilst the walls and lips 3 of the other part B are below. The parts A and B are preferably formed as shewn each part being flared outwardly as at 6 from a common base or arcuate waist line 7 so that the flange walls and lips 3 tend to have resilient engagement with the inner sides of their cylindrical housing 8, see Fig. 4. The flange walls 3 may taper towards their outer extremities. It frequently happens that with this type of packing one side of the piston to which the packing is applied is subjected to much greater pressure than the other, and to provide means that will be satisfactory for abnormal differences, the side subjected to the increase of pressure is formed with an additional incurved lip 9 as shewn in Fig. 4, said lip 9 being indented about its internal circumference to form passage ways 10, see Fig. 5. Incurved lips 9 may be provided on both upper and under side. Further to increase the resilient force of engagement of the walls 3 with the cylinder surface 8 spring steel expander rings 11 may be inserted as shewn in Fig. 4 to compel closer whilst yet resilient contact between these parts.

In Fig. 6 the invention is shewn as applied to a spigot section of a pipe coupling that is self-sealing upon disconnection and wherein the disc 1 constitutes a piston by itself the outer walls and lips 3 of the packing engaging the inner wall 8 of the cylinder. In this form of use the piston so constituted by the disc 1 is mobile under pressure of the spring 12 and the upper surface 13 of the disc to which the rubber or like compound 2 is applied constitute a seating for the valve 14.

In operation the packing device above set forth seals on both sides of the piston entity, the engaging resilient walls of the packing creating an initial pressure against the cylinder surface which is supplemented by the pressure of the fluid moved tending to increase contact pressure between the said packing and the inner faces of the cylinder in proportion to the fluid pressure existing or created by movement.

I claim:

1. An improved packing device having in combination an annular rigid supporting disc having a central aperture for application to a piston or the like, said disc having applied thereto a resilient body of a configuration to define an annular centrally apertured surface in a plane substantially parallel to said disc, said body including upper and lower cup shaped peripheral flanges that are inherently resilient and outwardly flared from an arcuate waistline to constitute walls and lips to engage the surface of a cylinder wall whereby in addition to the resiliency of the flanges themselves the sealing effect is proportional to the fluid pressure either side of the piston, said annular surface lying further from said waistline in a direction at right angles to the plane of the disc than said flanges, the central apertures of said disc and of said annular surface being coextensive and in register so that said annular surface is adapted to function as a valve facing.

2. An improved packing device as claimed in claim 1 wherein the outwardly flared flanges of the packing device taper toward their extremities on at least one side of a common waistline.

3. An improved packing device having in combination an annular rigid supporting disc having a central aperture for application to a piston or the like, said disc having applied thereto a resilient body of a configuration to define an annular centrally apertured surface in a plane substantially parallel to said disc, said body including upper and lower cup shaped peripheral flanges that are inherently resilient and outwardly flared from an arcuate waistline to constitute walls and lips to engage the surface of a cylinder wall whereby in addition to the resiliency of the flanges themselves the sealing effect is proportional to the fluid pressure either side of the piston, said annular surface lying further from said waistline in a direction at right angles to the plane of the disc than said flanges, the central apertures of said disc and of said annular surface being coextensive and in register so that said annular surface is adapted to function as a valve facing, one of said outwardly flared flanges being provided with an incurved lip for admission of fluid under pressure, and spring steel expander rings seated under said lip under compression tending further to bias the respective flange against the surface of the cylinder wall.

4. An improved packing device as claimed in claim 3 wherein the incurved lip is peripherally scalloped.

PERCIVAL EDWARD THOMAS.

REFERENCES CITED

The following references are of record in the file of this patent:

UNITED STATES PATENTS

| Number | Name | Date |
| --- | --- | --- |
| 1,577,732 | Lamb | Mar. 23, 1926 |
| 2,004,669 | Miller | June 11, 1935 |
| 2,059,728 | Dick | Nov. 3, 1936 |
| 2,313,271 | Schnell | Mar. 9, 1943 |